(12) United States Patent
Bowler

(10) Patent No.: US 10,927,995 B2
(45) Date of Patent: Feb. 23, 2021

(54) METHODS FOR REPAIRING COMPONENT CORED PASSAGES

(71) Applicant: HONEYWELL INTERNATIONAL INC., Morris Plains, NJ (US)

(72) Inventor: John Bowler, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 102 days.

(21) Appl. No.: 16/181,831

(22) Filed: Nov. 6, 2018

(65) Prior Publication Data

US 2020/0141528 A1 May 7, 2020

(51) Int. Cl.
| F16L 55/18 | (2006.01) |
| B23P 6/00 | (2006.01) |
| F16L 55/162 | (2006.01) |

(52) U.S. Cl.
CPC ............ *F16L 55/18* (2013.01); *B23P 6/00* (2013.01); *F16L 55/162* (2013.01); *B23P 2700/01* (2013.01); *B23P 2700/50* (2013.01)

(58) Field of Classification Search
CPC ..... F16L 55/18; F16L 55/162; F16L 2101/16; F16L 55/30; F16L 2101/60
USPC ................. 138/97, 93; 405/150.2, 184.1
See application file for complete search history.

(56) References Cited

U.S. PATENT DOCUMENTS

| 1,606,602 | A | * | 11/1926 | Stauffer | .......... | B25B 27/00 |
| | | | | | | 138/97 |
| 2,847,958 | A | | 8/1958 | Norton et al. | | |
| 3,211,573 | A | * | 10/1965 | Hight | ........... | B05C 7/08 |
| | | | | | | 138/97 |
| 3,363,301 | A | | 1/1968 | Delaruelle et al. | | |
| 3,551,995 | A | | 1/1971 | Marechal | | |
| 4,013,097 | A | * | 3/1977 | Calandra | ........... | F16K 7/10 |
| | | | | | | 138/93 |
| 4,069,573 | A | | 1/1978 | Rogers, Jr. et al. | | |
| 4,368,571 | A | * | 1/1983 | Cooper, Jr. | ........ | B21D 39/203 |
| | | | | | | 138/97 |
| 4,582,551 | A | | 4/1986 | Parkes et al. | | |

(Continued)

FOREIGN PATENT DOCUMENTS

CA  2559226 A1  3/2008

OTHER PUBLICATIONS

Maddrey Enterprises Inc., "Methods to Repair Case Iron Sewer Drains Without Digging Through Floors," http://www.trenchless-pipelining.com/methods-restore-cast-iron-sewer-drains/, downloaded on Jul. 18, 2018.

*Primary Examiner* — James F Hook
(74) *Attorney, Agent, or Firm* — Lorenz & Kopf, LLP

(57) ABSTRACT

Methods and apparatus are provided for repairing a damaged area within a cored passage of a component. The method includes providing a repair tool that has a support portion, a leading portion extending from a first end of the support portion, and a trailing portion extending from a second end of the support portion. The leading portion of the repair tool is inserted into a first opening of the cored passage, and is threaded through the cored passage until the support portion is positioned at the damaged area within the cored passage. A restoration activity is performed on the damaged area as the support portion supports the cored passage proximate to the damaged area. Upon completion of the restoration activity, the repair tool is removed from the cored passage.

17 Claims, 10 Drawing Sheets

(56) References Cited

U.S. PATENT DOCUMENTS

| | | | |
|---|---|---|---|
| 4,647,072 A | | 3/1987 | Westman |
| 4,715,747 A | * | 12/1987 | Behrens ................ H02G 1/086 134/22.11 |
| 4,724,693 A | | 2/1988 | Tedder |
| 4,911,193 A | * | 3/1990 | Smith .................... F16L 55/10 137/15.15 |
| 5,034,180 A | | 7/1991 | Steketee, Jr. |
| 5,186,215 A | | 2/1993 | Gilleland |
| 5,244,624 A | | 9/1993 | Steketee, Jr. |
| 5,388,616 A | * | 2/1995 | Muller ................ F16L 55/1651 138/104 |
| 5,451,741 A | | 9/1995 | Doronin et al. |
| 5,671,778 A | | 9/1997 | Sakuragi et al. |
| 5,726,408 A | | 3/1998 | Easterday |
| 5,727,597 A | | 3/1998 | Fisco |
| 5,765,597 A | | 6/1998 | Kiest, Jr. et al. |
| 7,073,536 B2 | | 7/2006 | Blackmore et al. |
| 7,137,757 B1 | | 11/2006 | Cosban |
| 7,241,076 B1 | | 7/2007 | Cosban |
| 7,523,764 B2 | | 4/2009 | Lepola et al. |
| 7,896,032 B2 | | 3/2011 | Kiest, Jr. |
| 8,186,385 B2 | | 5/2012 | Iwasaki-Higbee |
| 8,550,121 B2 | | 10/2013 | Kiest, Jr. |
| 8,580,364 B2 | | 11/2013 | Quitter |
| 8,739,809 B2 | | 6/2014 | Kiest, Jr. |
| 9,175,798 B1 | | 11/2015 | Thompson |
| 2005/0000593 A1 | | 1/2005 | Shaltiel |
| 2005/0211322 A1 | | 9/2005 | Lohbeck |
| 2005/0279417 A1 | * | 12/2005 | Bednarzik ............ F16L 55/179 138/93 |
| 2006/0112996 A1 | * | 6/2006 | Poole .................. F16L 55/1645 138/97 |
| 2007/0286682 A1 | * | 12/2007 | Freyer .................... F16L 55/26 405/184.1 |
| 2008/0264547 A1 | | 10/2008 | Raab et al. |
| 2009/0308476 A1 | * | 12/2009 | DeMartino ............ F16L 9/12 138/104 |
| 2009/0314409 A1 | | 12/2009 | Ehsani |
| 2010/0281670 A1 | | 11/2010 | Adelman |
| 2012/0107051 A1 | * | 5/2012 | Sweeney ................ B08B 9/055 405/184.1 |
| 2012/0111082 A1 | | 5/2012 | Garza |
| 2015/0033559 A1 | | 2/2015 | Bruck et al. |
| 2015/0034266 A1 | | 2/2015 | Bruck et al. |
| 2015/0107713 A1 | * | 4/2015 | Manners ................ F16L 55/10 138/97 |
| 2015/0369399 A1 | | 12/2015 | Fyfe |
| 2016/0178108 A1 | | 6/2016 | Ehsani |
| 2017/0219155 A1 | | 8/2017 | Llewellyn et al. |

* cited by examiner

METHODS FOR REPAIRING COMPONENT CORED PASSAGES

TECHNICAL FIELD

The present invention generally relates to cored passages of manufactured components, and more particularly relates to repairing damaged areas of cored passages of manufactured components.

BACKGROUND

Aircraft, vehicles, and industrial machinery may include many types of manufactured components. Such manufactured components may include cored passages or other internal piping, including air passages, oil tubes, lightening voids, and the like. These cored passages may be subject to damage and other flaws with respect to integrity that may arise during the manufacturing process, during handling, and/or during usage. Regardless, conventional techniques for successfully repairing flaws in cored passages have proven difficult, and typically, the component must be replaced in such conditions.

Accordingly, it is desirable to improved methods for repairing cored passages of manufactured components. Furthermore, other desirable features and characteristics of the present invention will become apparent from the subsequent detailed description of the invention and the appended claims, taken in conjunction with the accompanying drawings and this background of the invention.

BRIEF SUMMARY

In one embodiment, a method of repairing a damaged area within a cored passage of a component includes providing a repair tool that has a support portion, a leading portion extending from a first end of the support portion, and a trailing portion extending from a second end of the support portion. The leading portion of the repair tool is inserted into a first opening of the cored passage, and is threaded through the cored passage until the support portion is positioned at the damaged area within the cored passage. A restoration activity is performed on the damaged area as the support portion supports the cored passage proximate to the damaged area. Upon completion of the restoration activity, the repair tool is removed from the cored passage.

In another embodiment, a repair tool for use in repairing a damaged area within a cored passage of a component includes a support portion, a leading portion, and a trailing portion. The support portion has a first end and a second end. The leading portion extends from the first end of the support portion to a first distal end. The trailing portion extends from the second end of the support portion to a second distal end. The first and second distal ends are each tufted.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
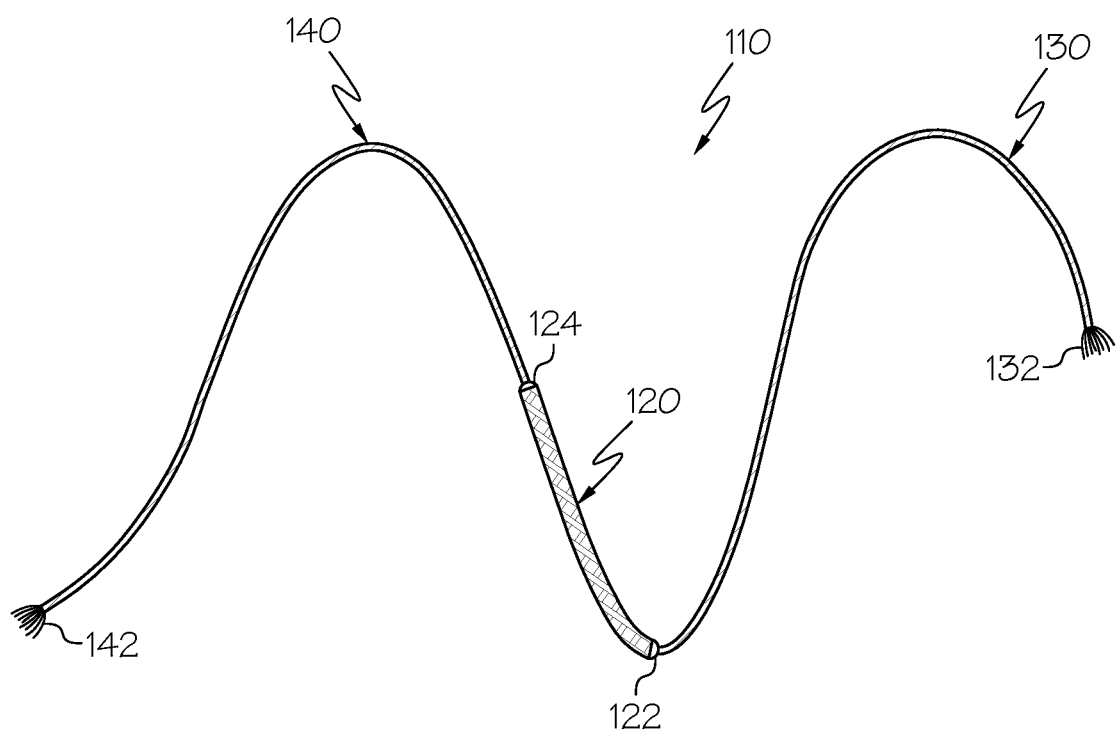
FIG. 1 is a side view of a repair tool for repairing manufactured cored passages in accordance with an exemplary embodiment.

FIG. 1 is a side view of a repair tool 110 for repairing cored passages of manufactured components in accordance with an exemplary embodiment. Generally, as discussed in greater detail below, the repair tool 110 is utilized to repair cored (or internal) passages for various types of components. Some non-limiting examples of components include lubrication system passages, fluid (air, water, gas, etc.) cooling passages/ducts, suction lines, drain lines, and reservoirs, just to name a few.

The repair tool 110 is formed by a central support portion 120, a leading portion 130 extending from one end 122 of the support portion 120, and trailing portion 140 extending from the other end 124 of the support portion 120. The distal ends 132, 142 of the leading and trailing portions 130, 140 form the distal ends of the repair tool 110. Generally, the leading and trailing portions 130, 140 enable placement or positioning of the support portion 120 into an appropriate location within a passage at which repair is required. In one embodiment, the leading and trailing portions 130, 140 may be cord-type structures with a flexibility that enables the repair tool 110 to be threaded or pulled through a passage. In other embodiments, the leading and/or trailing portions 130, 140 may be rods or otherwise formed by a relatively stiff material that additionally or alternatively enables the repair tool 110 to be pushed through a passage. Moreover, in some embodiments, such as the ones depicted herein, the distal ends 132, 142 may be tufted. This configuration facilitates the use a pressurization air source or suction air source to push or pull, respectively, the repair tool 110 into and through the passage to be repaired.

As described in greater detail below, the support portion 120 may be a generally cylindrical shape with a stiffness suitable to provide support for a surrounding passage wall during a restoration activity or procedure (e.g., rebuilding the passage wall in some manner, such as welding). In some embodiments, the support portion 120 may additionally have a flexibility that enables maneuverability or positioning into the appropriate position to perform the restoration activity associated with the repair, as well as removal after the restoration activity. As one example, the support portion 120 may be hollow. Typically, the support portion 120 has a diameter that is greater than the diameters of the leading and/or trailing portions 130, 140.

Figure 2:
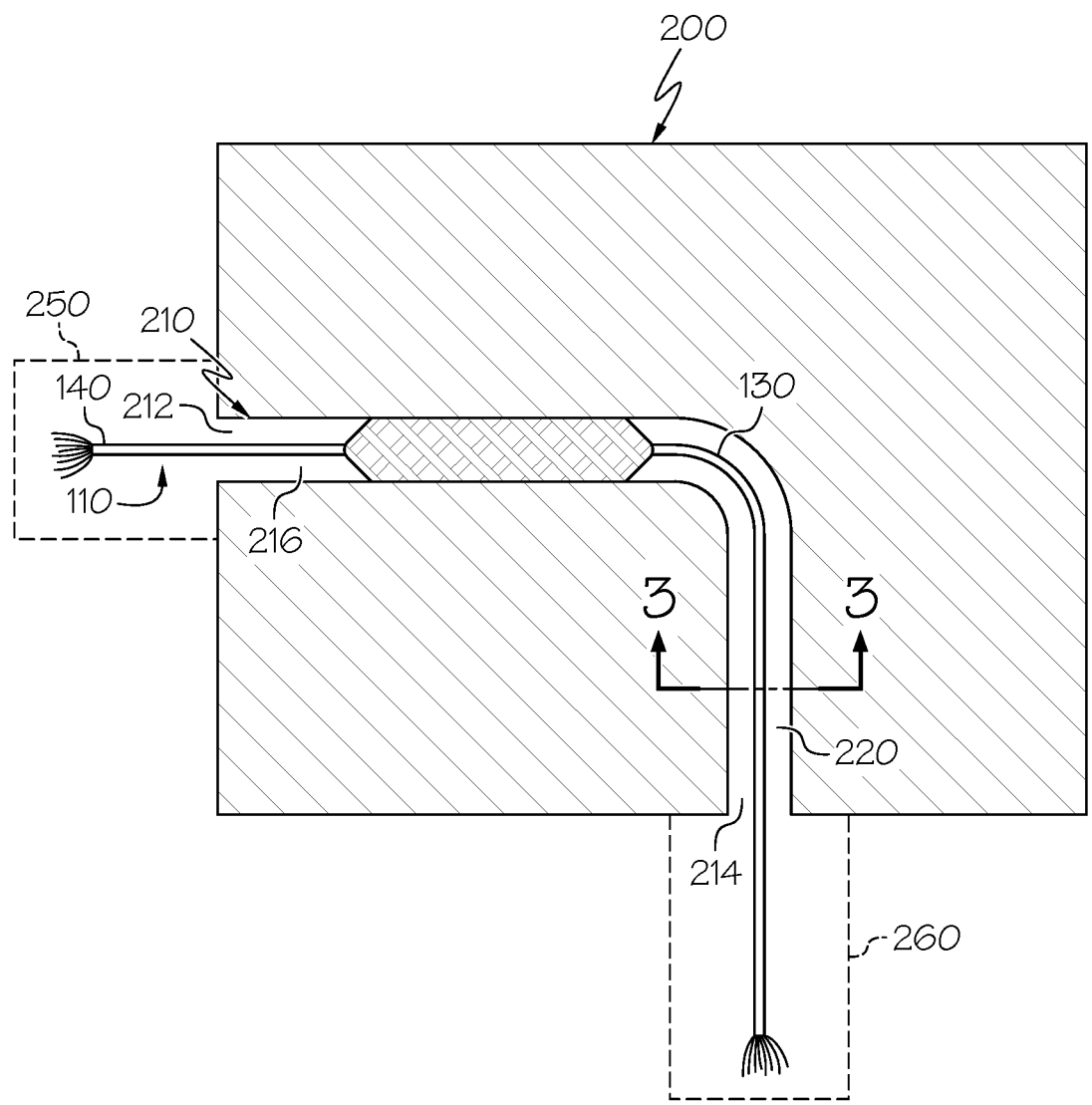
FIG. 2 is a first cross-sectional view of a component with a cored passage during a repair process according to an exemplary embodiment.
Figure 3:
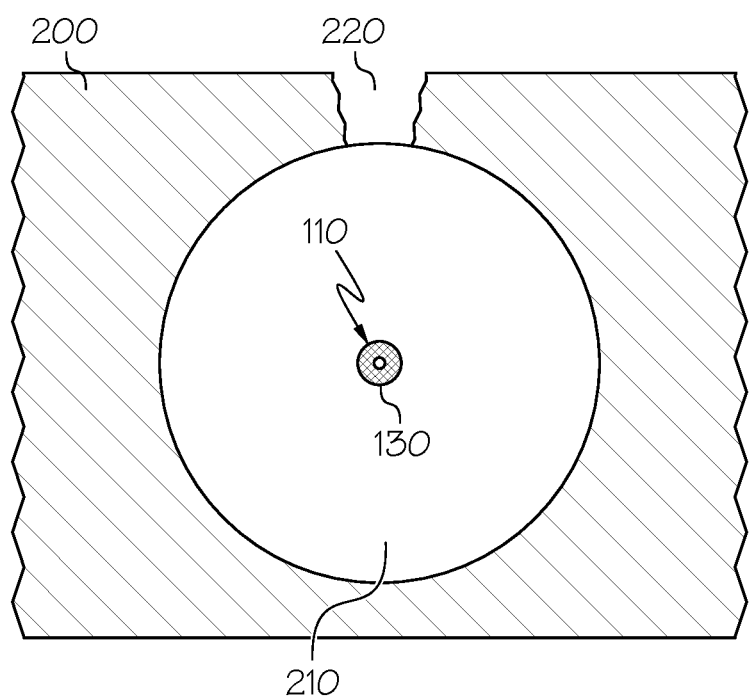
FIG. 3 is an orthogonal cross-sectional view through line 3-3 of FIG. 2 according to an exemplary embodiment.

FIG. 2 is a first cross-sectional view of a component 200 with a cored passage 210 during a repair process (or method) according to an exemplary embodiment. As noted above, the component 200 may include any type of component 200 with a cored passage 210 that requires or would benefit from repair. FIG. 3 is an orthogonal cross-sectional view through line 3-3 of FIG. 2. FIG. 3 particularly depicts the damaged area 220 of the passage 210 suitable for repair. In this example, the passage 210 may include a first end 212, a second end 214, and an internal section 216 that extends between the first and second ends 212, 214 and includes the damaged area 220.

In the view of FIGS. 2 and 3, the repair tool 110 has been inserted into the first end 212 of the passage 210 and the leading portion 130 has been threaded through the passage 210 such that the leading portion 130 is extending out of the second end 214. In this condition, the leading portion 130 is proximate to the location of the damaged area 220. As discussed in greater detail below, the repair tool 110 may be manually manipulated via the leading and/or trailing portions 130, 140 by an operator or by a machine or by other force mechanism, such as by air pressure. For example, as depicted in phantom in FIG. 2, a pressurized air source 250 may be disposed adjacent the first end 212 of the passage 210 to assist in pushing the repair tool 110 into and through the passage 210, or a suction air source 260 may be disposed adjacent the second end 214 of the passage 210 to assist in pulling the repair tool 110 into and through the passage 210.

Figure 4:
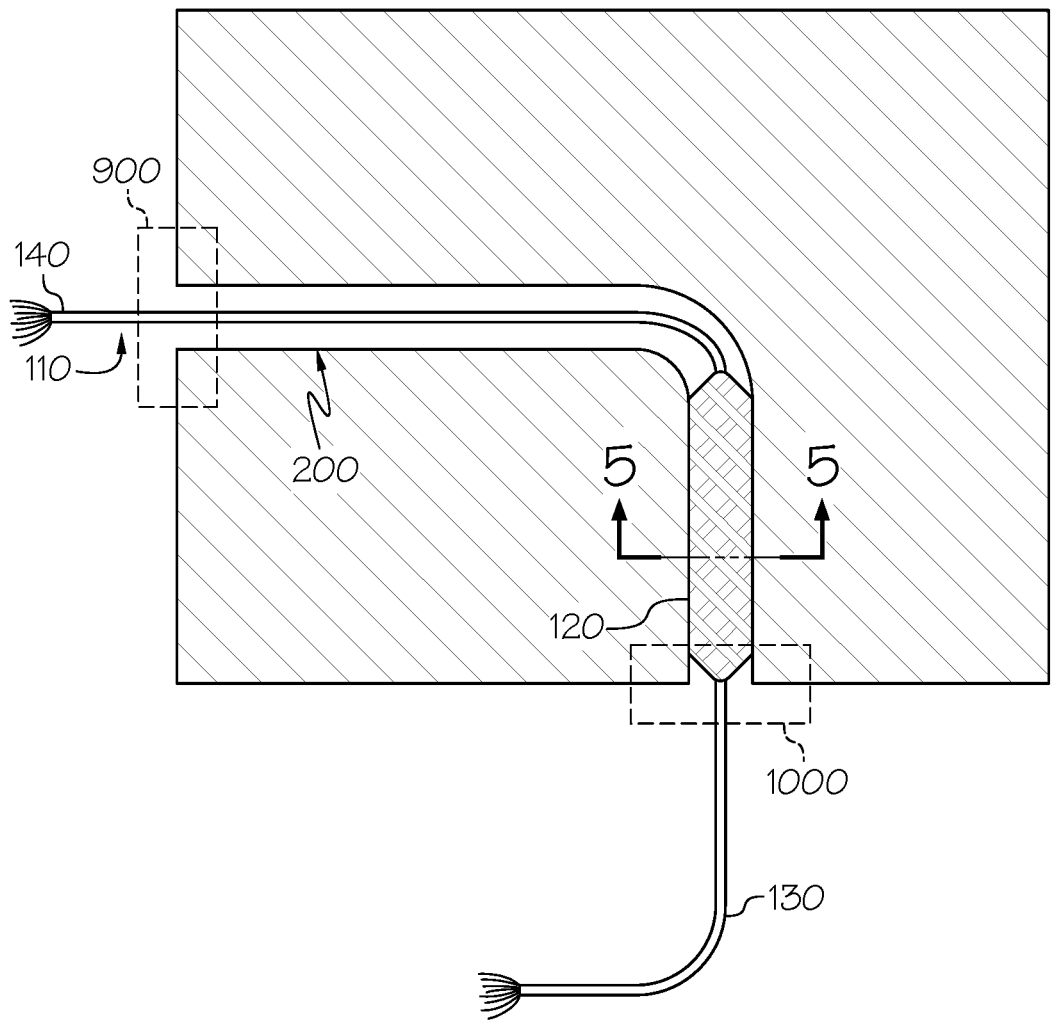
FIG. 4 is a second cross-sectional view of the component with a cored passage during the repair process according to an exemplary embodiment.
Figure 5:
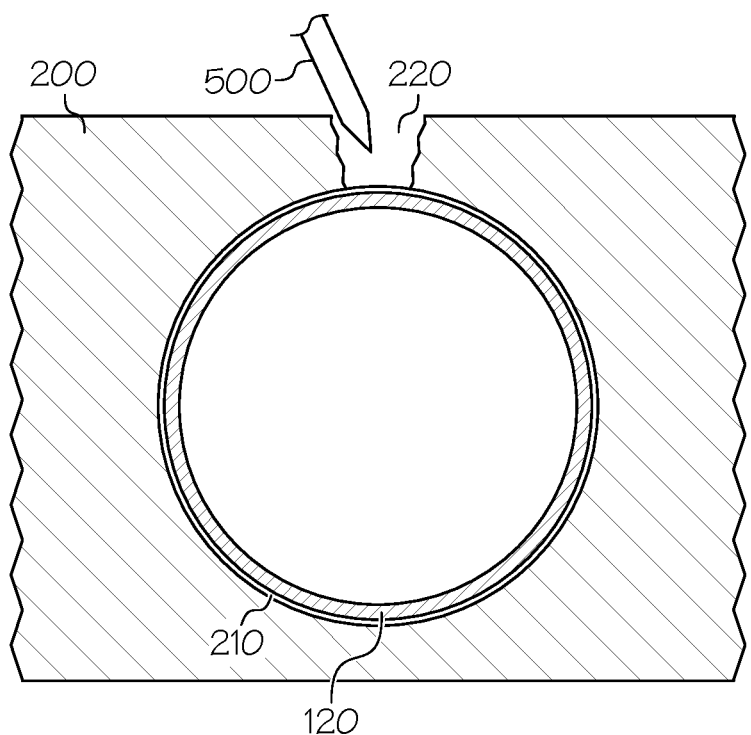
FIG. 5 is an orthogonal cross-sectional view through line 5-5 of FIG. 4 according to an exemplary embodiment.

FIG. 4 is a further cross-sectional view of the component 200 with the cored passage 210 during the repair process, and FIG. 5 is an orthogonal cross-sectional view through line 4-4 of FIG. 4. Generally, the situation depicted in FIGS. 4 and 5 is subsequent in time to the situation depicted in FIGS. 3 and 4.

In FIGS. 4 and 5, the repair tool 110 has continued to be threaded through the passage 210, e.g., by pulling on the leading portion 130, pushing the trailing portion 140, or other mechanism for manipulating the repair tool 110. In effect, the leading portion 130 may function as a pilot through the passage 210. In other embodiments, the trailing portion 140 may be a rod suitable for pushing the tool 110 through the passage 210. Through manipulation of the leading and/or trailing portions 130, 140, the repair tool 110 is positioned such that the support portion 120 is proximate to the damaged area 220.

As shown in FIGS. 4 and 5, the support portion 120 may have a shape and diameter that approximates the shape and diameter of the passage 210 at the damaged area 220. In some embodiments, the support portion 120 may have a resiliency and/or an elasticity that conforms and/or supports the walls of the cored passage 210 at the damaged area 220 during a wall restoration activity described below. This functionality may be implemented through the use of woven, high-temperature (e.g., 375° F.) resistant fibers or elastomeric polymer cords that are formed into a hollow, relatively thin-walled structure. The support structure 120 may also or instead be fiber filled, liquid filled, or gel filled.

Figure 6:
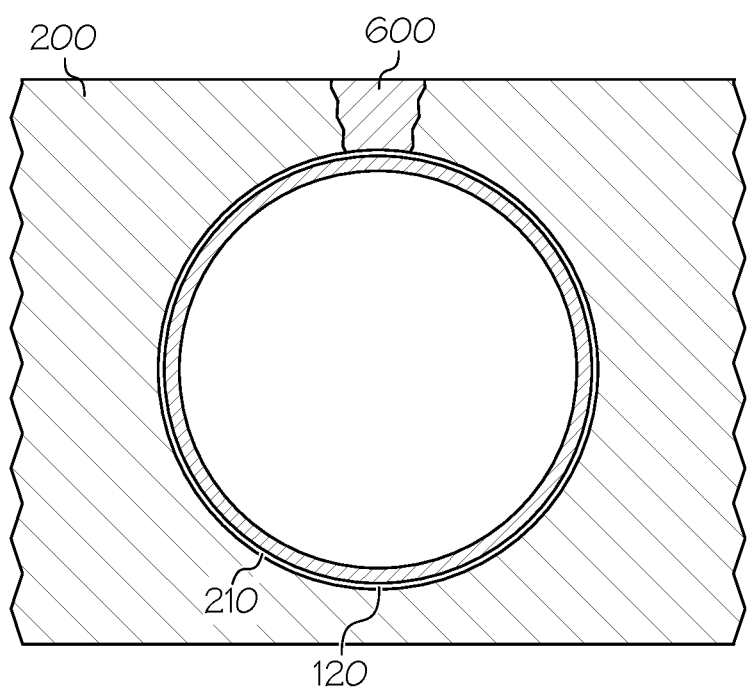
FIG. 6 is a further orthogonal cross-sectional view through line 5-5 of FIG. 4, subsequent in time to the view of FIG. 5, according to an exemplary embodiment.

As best shown in FIG. 5, the support portion 120 supports the walls of the cored passage 210 during a restoration activity, particularly a welding procedure performed with a welding tool 500. Unless otherwise supported by the support portion 120, the welding procedure would present difficulties and could result in collapsing the passage. However, as shown in the view of FIG. 6, which is identical to the view of FIG. 5 except subsequent in time, the support portion 120 supports the wall of the passage 210 as a weld 600 is formed to thereby restore the passage 210. The support portion 120 provides a backing or opposing force to reinforce the structure of the passage wall during welding. In effect, the support portion 120 functions as a stent that is subsequently removed, as discussed below.

Any suitable restoration activity may be provided. Some non-limiting examples including welding, soldering, brazing, polymer resin infill, composite material repair, and ceramic repair, just to name a few.

Figure 7:
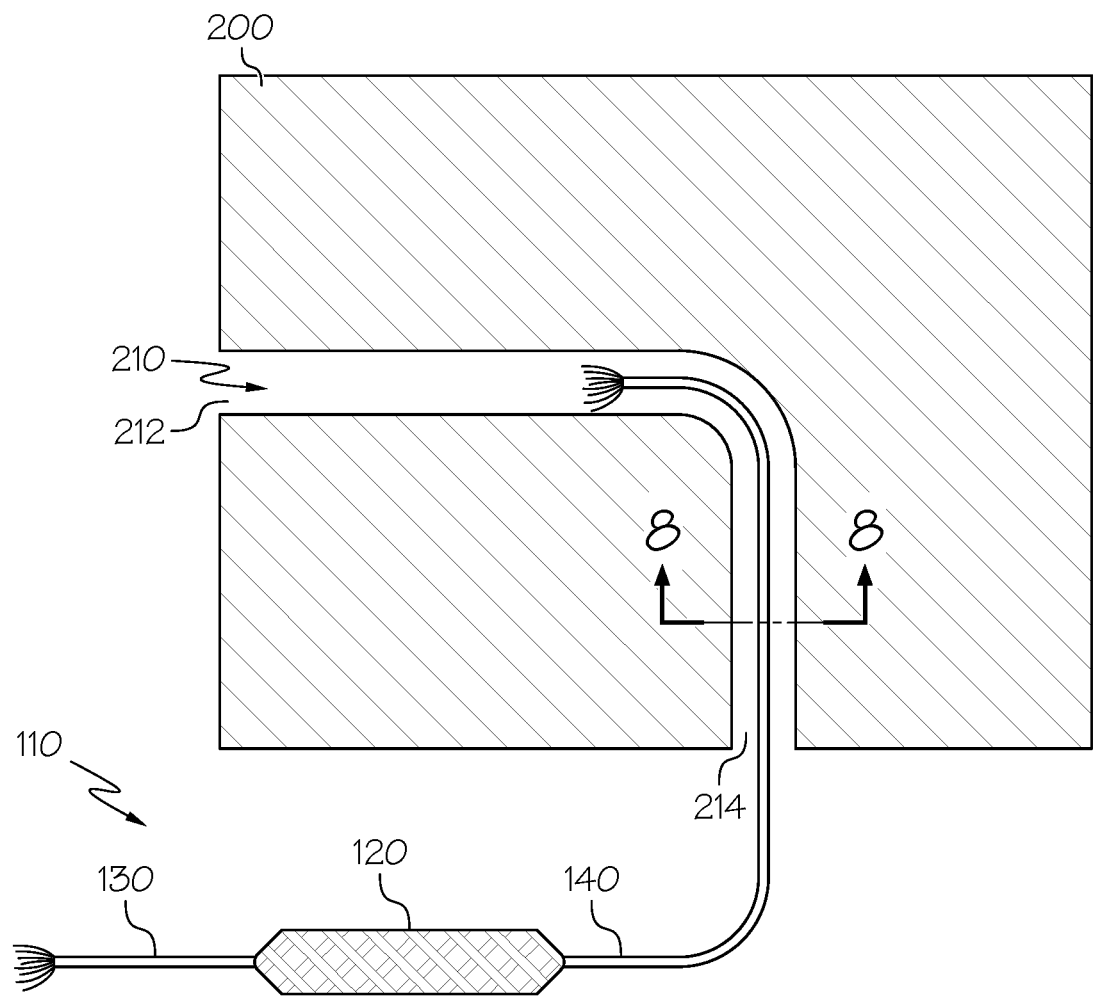
FIG. 7 is a second cross-sectional view of the component with a cored passage during the repair process according to an exemplary embodiment.
Figure 8:
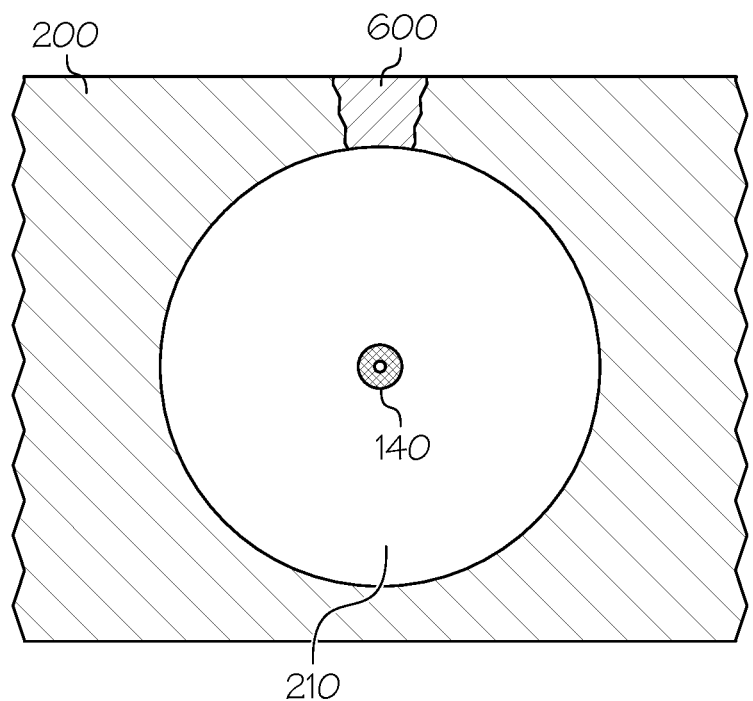
FIG. 8 is an orthogonal cross-sectional view through line 8-8 of FIG. 7 according to an exemplary embodiment.

FIG. 7 is a further cross-sectional view of the component 200 with the cored passage 210 during the repair process, and FIG. 8 is an orthogonal cross-sectional view through line 8-8 of FIG. 7. In the view of FIGS. 7 and 8, the restoration of the previously-damaged area 220 has been completed with the weld 600 and the tool 110 is being removed from the cored passage 210 via the second end 214. Alternatively, the tool 110 may be removed via the first end 212 by pulling the trailing portion 140. Upon removal, the repair method may be considered complete, although some embodiments may have variations and/or additional steps.

As introduced above, the elasticity and resiliency of the support portion 120 to fill and support the surrounding wall during the restoration may be a function of 1) the self-supported, internal structure of the support portion 120 and/or 2) an inflation of the support portion 120 with fluid upon being positioned at the appropriate location, as described in greater detail above. As one example, the support portion 120 may be formed by a woven structure that provides the internal structure for support. In some instances, particularly during high temperature restoration activities, the support portion 120 may be formed of temperature resistant materials, such as fiberglass, ceramic wool, and the like. The leading and trailing portions 130, 140 may be formed from similar materials. In further embodiments, as noted above, the support portion 120 may be inflatable. In such examples, the support portion 120 may be formed of, or supplemented by, a plastic or rubber bladder or cavity structure for receiving and holding fluid to inflate the support portion 120 as the support portion 120 takes the shape of the surrounding passage 210. Additional details regarding an inflatable support portion are provided below.

In some embodiments, the support portion 120 may be coated with an air-cure or heat-cure resin. As the support portion 120 is positioned into the location for restoration, the resin adheres to the surrounding passage 210 such that, upon curing, the resin provides a finish to the interior walls of the passage 210.

Accordingly, the repair tool 110 provides a mechanism for supporting the interior wall of a cored passage 210 of a component 200 as a further restoration activity, such as welding, is implemented. The repair tool and/or repair methods discussed above may be subject to a number of variations that may be used in conjunction with, or as an alternative to, aspects of the above-described embodiments.

In some embodiments, the leading and/or trailing portions 130, 140 may include markings or graduations that indicate the relative position or location of the support portion 120 within the passage 210. Examples are provided by the views of FIGS. 9 and 10.

Figure 9:
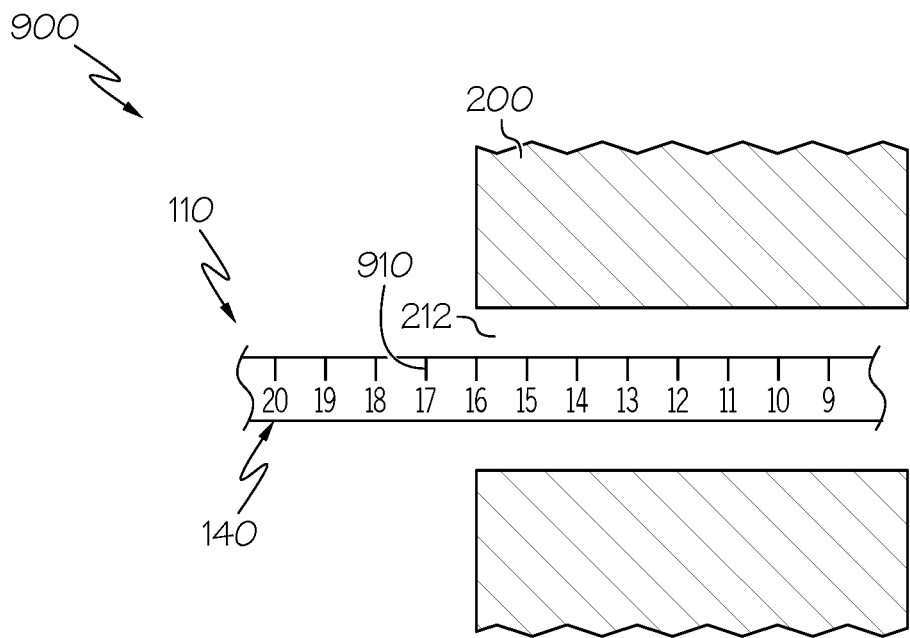
FIGS. 9 and 10 are more detailed views of portions of FIG. 4 according to exemplary embodiments.
Figure 10:
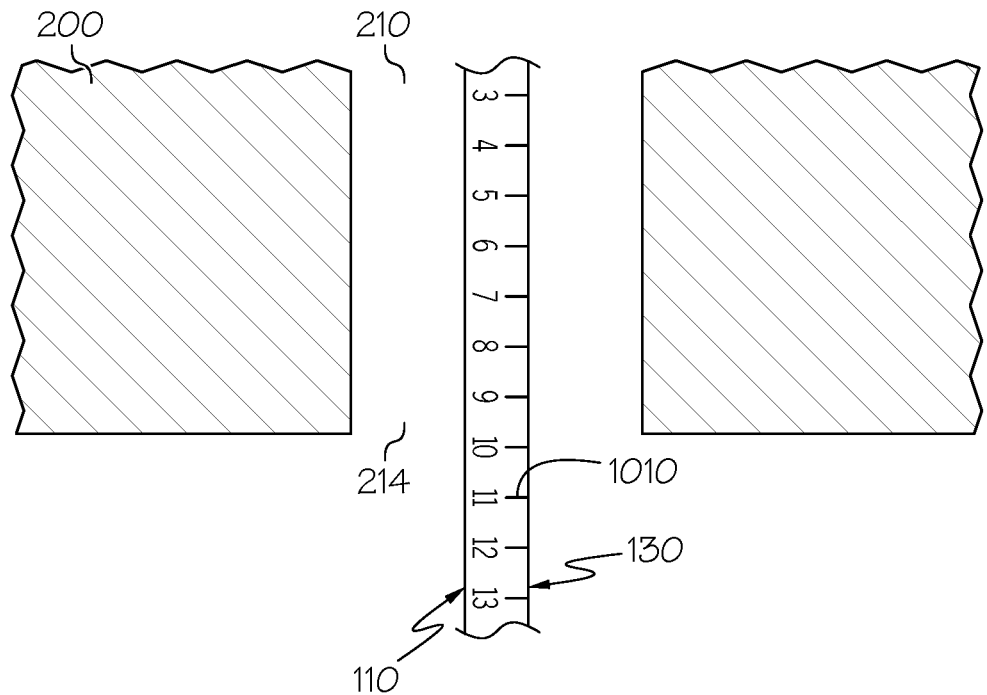

FIG. 9 is a more detailed view of area 900 depicted in FIG. 4. As shown, the trailing portion 140 may have markings 910 that represent the relative distance between the respective marking 910 and the support portion 120, e.g., the end 124 of support portion 120. For example, in the view of FIG. 9, the markings 910 indicate that the support portion 120 is positioned within the passage 210 approximately 16 units (e.g., inches, millimeters, etc., as appropriate) from the first end 212 of the passage 210. Similarly, FIG. 10 is a more detailed view of area 1000 depicted in FIG. 10. As shown, the leading portion 130 may have markings 1010 that represent the relative distance between the respective marking 1010 and the support portion 120, e.g., the end 122 of support portion 120. For example, in the view of FIG. 10, the markings 1010 indicate that the support portion 120 is positioned approximately 9 units (e.g., inches, millimeters, etc., as appropriate) from the second end 214 of the passage 210.

In this manner, a user may utilize the markings 910, 1010 to determine the position of the support portion 120 inside the cored passage 210. As such, if the position of the damaged area 220 is known, the user may more accurately position the tool 110 such that the support portion 120 is in the appropriate location to continue the repair. In some embodiments, one or both of the markings 910, 1010 may be omitted.

Figure 11:
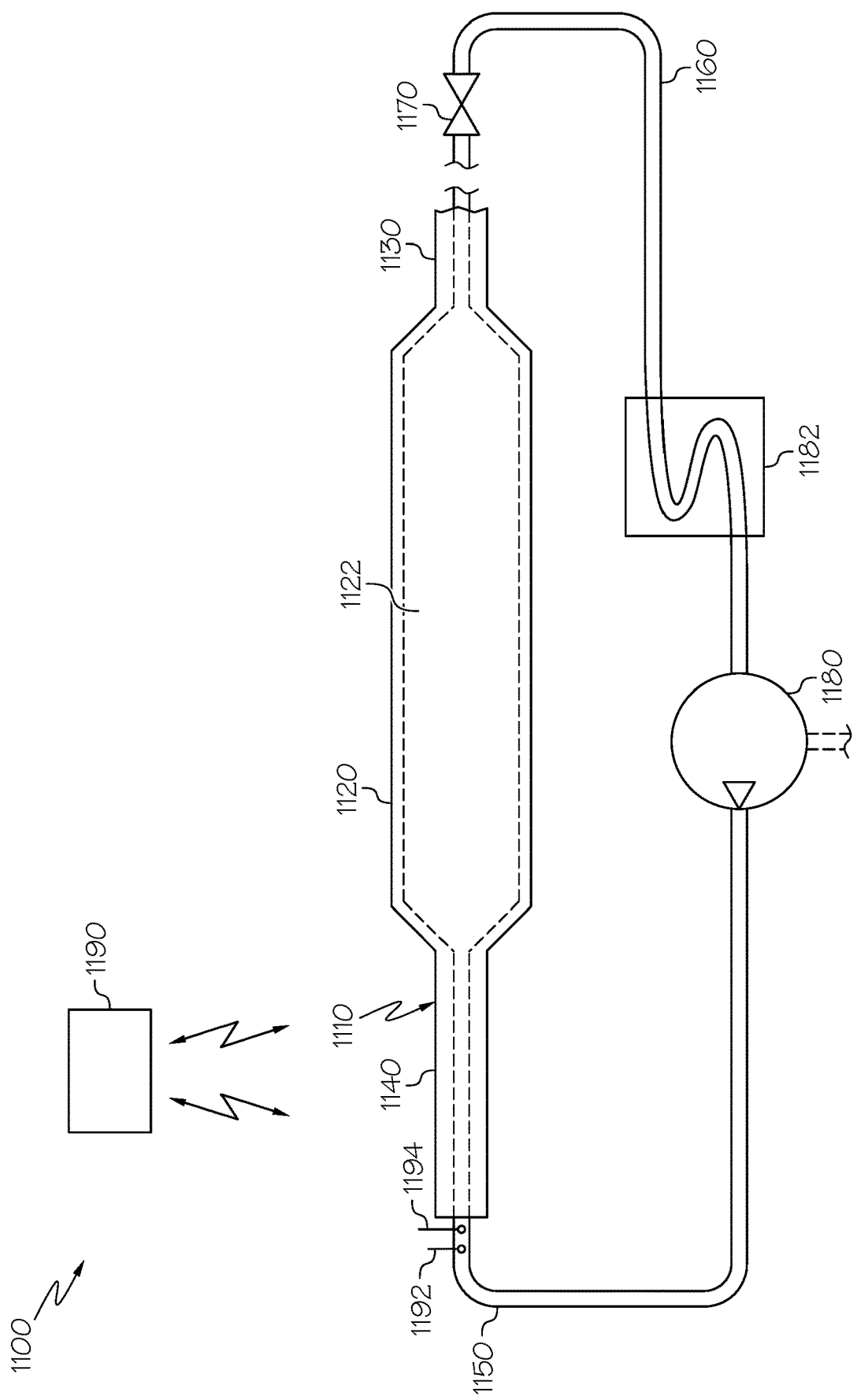
FIG. 11 is a schematic view of a system for repairing cored passages in accordance with a further exemplary embodiment.

As schematically depicted in FIG. 11, in some embodiments, a system 1100 may include a repair tool 1110 provided with fluid to maintain an appropriate temperature and/or pressure during the repair method and/or the particular restoration activity. As one example, the tool 1110 may include a support portion 1120, a leading portion 1130, and a trailing portion 1140, which unless otherwise noted may be similar to the tool 110 described above.

In this embodiment, the support portion 1120 may include a cavity 1122 for receiving the fluid. In particular, the cavity 1122 may be in fluid communication with a supply conduit 1150 extending through the trailing portion 1140 and an outlet conduit 1160 extending through the leading portion 1130. Generally, the supply conduit 1150 may be provided to introduce fluid into the cavity 1122, and the outlet conduit 1160 may be provided to release or drain fluid from the cavity 1122. A valve element 1170 may be provided on one or both of the conduits 1150, 1160 to facilitate fluid flow into or out of the cavity 1122 and/or to maintain the fluid in the cavity 1122. In other embodiments, the supply conduit 1150 may extend through the leading portion 1130 and the outlet conduit 1160 may extend through the trailing portion 1140, i.e., the direction of fluid flow may be reversed. Generally, the tool 1110 may be positioned into the appropriate location (e.g., with the support portion 120 proximate to the area to be repaired), and then, the fluid may be introduced into the cavity 1122 to provide an appropriate pressure and/or temperature.

In one embodiment, the fluid may be a liquid coolant, e.g., water or other type of coolant, that is circulated through the tool 1110 in order to maintain a predetermined or otherwise appropriate temperature for the tool 1110 and/or the passage being restored. In such an embodiment, a pump 1180 and/or heat exchanger 1182 may be provided. For example, the pump 1180 may maintain a desired or appropriate fluid pressure within the cavity 1122 and/or circulation the coolant. The heat exchanger 1182 may be configured to facilitate the removal of heat from the coolant.

In further embodiments, the system 1100 may further include one or more controllers 1190 that operate to maintain an appropriate temperature or pressure of the fluid within the system 1100. In some examples, the controller 1190 may also operate to gather and/or display information associated with the repair method and/or facilitate placement of the tool 1110 or performance of the restoration activity. Such commands by the controller 1190 may be implemented based on signals from one or more sensors 1192, 1194. In various embodiments, the sensors 1192, 1194 may be pressure sensors, temperature sensors, position sensors, or combinations thereof. As such, the controller 1190 may be operatively coupled to communicate with one or more of the valve element 1170, pump 1180, heat exchanger 1182, sensors 1192, 1194, and/or other components (e.g., the welding tool or other restoration activity, a user interface, etc.) in any suitable manner, including a wired or wireless bus and/or communication technique. The commands from the controller 180 may be generated based on schedules associated with operating conditions. As an example, the controller 1190 may adjust the fluid pressure by controlling the pump 1180 and/or the valve element 1170.

In some embodiments, the fluid in the system 1100 may be air (or liquid) that is supplied to the cavity 1122 in order to provide sufficient pressure in order to inflate the support portion 1120. In such an embodiment, one or more components of the system 1100 depicted in FIG. 11 may be omitted, such as the heat exchanger. As an example, the pump 1180 (or alternately, another mechanism for providing air pressure) may force air into the cavity 1122 to inflate the support portion 1120 while the valve element 1170 is closed to prevent the air from exiting the cavity 1122. As an alternative, the outlet conduit 1160 may be omitted such that the cavity 1122 has a closed end. In such an embodiment, upon inflation of the cavity 1122, the supply conduit 1150 may be closed to maintain the inflation of the support portion 120 during the subsequent restoration activity (e.g., welding), and upon completion, the air may be vented by opening the conduit 1150 to deflate the support portion 120 prior to removal.

In the embodiments discussed above, the tool 110, 1110 may be manually manipulated via the leading portions 130, 1130 and/or the trailing portions 140, 1140, e.g., by pushing and pulling the tool 110, 1110 through the passage 210. However, other mechanisms may be provided to reposition or maneuver the tool.

Figure 12:
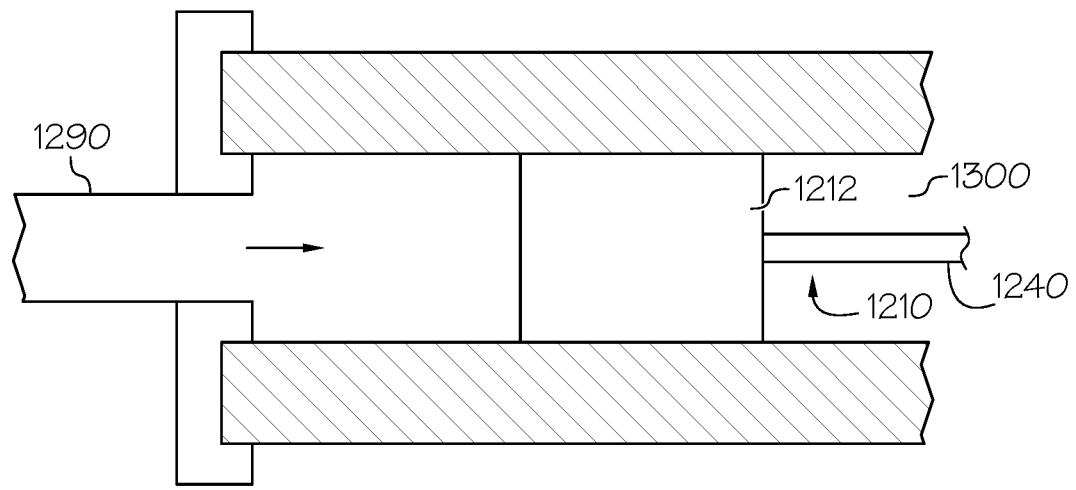
FIGS. 12 and 13 are respective cross-sectional and isometric views of one end of a repair tool for repairing cored passages in accordance with a further exemplary embodiment.
Figure 13:
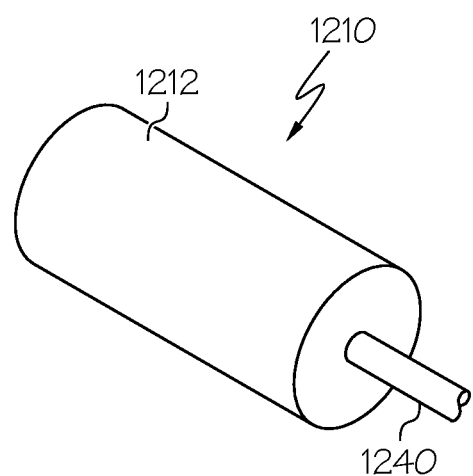

A further exemplary embodiment is depicted in FIGS. 12 and 13. FIGS. 12 and 13 are cross-sectional and isometric views, respectively, of one end 1212 of a repair tool 1210 for repairing a manufactured cored passage 1300 in accordance with a further exemplary embodiment. In FIGS. 12 and 13, the end 1212 of the repair tool 1210 is on a trailing portion 1240, which in this embodiment, is a relatively stiff, rod-type structure.

In this example, the end 1212 has a size and shape that approximates the size and shape of the corresponding passage 1300. In effect, the end 1212 forms a generally air-tight seal with the walls of the passage 1300. As a result, pressure may be provided from a pressure source 1290 in order to exert a force on the end 1212, thereby moving the repair tool 1210. In other embodiments, a similar end may be provided on the end of the leading portion in lieu of, or in combination with, the end 1212 on the trailing portion 1240. In further embodiments, negative pressure (i.e., suction) may be utilized.

As such, the repair tools described above may be used within the context of a method for repairing a cored passage. In a first step, the repair tool may be provided and include a support portion, a leading portion, and a trailing portion. In a further step, the repair tool is inserted into the damaged passage. In a further step, the repair tool is positioned (e.g., with the leading portion and/or trailing portion) such that the support portion is proximate to the area to be repaired. In some embodiments, during a further step, the support portion may be inflated with air or liquid, while in other embodiments, the support portion has an appropriate shape, size, resiliency, and elasticity to provide sufficient support for the passage wall during a subsequent restoration activity. In a further step, a restoration activity is performed, such as welding. Upon completion of the restoration activity, in a final step, the repair tool is removed from the passage. Additional steps may be provided and/or one or more of the steps discussed above may be omitted.

Accordingly, the embodiments discussed above provide a number of benefits. As noted above, conventionally, damage to cored passages typically results in scrapping and replacing the component due to the difficulty of making an effective repair. Exemplary embodiments discussed above enable repair of these components in an economical and effective manner. As such, the repair of these components provides a reduction in manufacturing costs as well as improved turn-time and profitability during after-market repairs.

Generally, the controller discussed above may be implemented in various manners, such as in software on a processor, on a programmable chip, on an Application Specific Integrated Chip (ASIC), or as a hardware circuit. An example embodiment of a controller 1190 may be in the form of a computing device having, among other things, a processing unit and a memory which has stored therein computer-executable instructions. The processing unit may include any suitable devices to implement functions described herein such that instructions, when executed by the computing device or other programmable apparatus, may cause the functions/acts/steps specified in the methods described herein to be executed. The processing unit may include, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof. The memory may include non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally, such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may include any storage means (e.g., devices) suitable for retrievably storing machine-readable instructions executable by processing unit. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of repairing a damaged area within a cored passage of a component, comprising the steps of:
   providing a repair tool with a hollow support portion, a hollow leading portion extending from a first end of the support portion, and a hollow trailing portion extending from a second end of the support portion, wherein the support portion is cylindrical and has a first diameter, the leading portion and the trailing portion each have a second diameter that is less than the first diameter, and wherein at least one of the leading portion or the trailing portion includes evenly spaced distance markings on an outer surface thereof, each distance marking representing a distance from an end the support portion to the distance marking;
   inserting the leading portion of the repair tool into a first opening of the cored passage;
   threading the repair tool through the cored passage until the distance markings indicate the support portion is positioned at the damaged area within the cored passage;
   performing a restoration activity on the damaged area as the support portion supports the cored passage proximate to the damaged area; and
   removing, upon completion of the restoration activity, the repair tool from the cored passage.

2. The method of claim 1, wherein the leading portion is a cord material, and wherein the threading step includes threading the repair tool through the cored passage by pulling the leading portion.

3. The method of claim 1, wherein the trailing portion is a rod, and wherein the threading step includes threading the repair tool through the cored passage by pushing the trailing portion.

4. The method of claim 1, wherein the first diameter is approximately equal to a diameter of the cored passage.

5. The method of claim 1, further comprising, upon positioning the support portion at the damaged area, inflating the support portion with a fluid.

6. The method of claim 5, wherein the inflating step includes inflating the support portion with a gas.

7. The method of claim 5, wherein the inflating step includes inflating the support portion with a liquid.

8. The method of claim 5, wherein the inflating step includes inflating the support portion with a gel.

9. The method of claim 1, further comprising, upon positioning the support portion at the damaged area, circulating a coolant through the repair tool.

10. The method of claim 1, wherein the step of performing the restoration activity includes welding the damaged area.

11. The method of claim 1, wherein the step of threading the repair tool through the cored passage includes manipulating the repair tool with air from a pressurize source until the support portion is positioned at the damaged area within the cored passage.

12. The method of claim 1, wherein the step of threading the repair tool through the cored passage includes manipulating the repair tool with air from a suction air source until the support portion is positioned at the damaged area within the cored passage.

13. The method of claim 1, wherein the restoration activity on the damaged area comprises one or more of welding, brazing, soldering, polymer resin infill, composite material repair, and ceramic repair.

14. The method of claim 1, wherein the step of removing the repair tool from the cored passage includes manipulating the repair tool with air from a pressurize source.

15. The method of claim 1, wherein the step of removing the repair tool through the cored passage includes manipulating the repair tool with air from a suction air source.

16. A repair tool for use in repairing a damaged area within a cored passage of a component, the repair tool comprising:
   a hollow support portion formed of a first material and having a first end and a second end, the support portion being cylindrical and having a first diameter;
   a hollow leading portion formed of a second material that is different from the first material and extending from the first end of the support portion to a first distal end, the leading portion having a second diameter that is less than the first diameter; and
   a hollow trailing portion formed of the second material and extending from the second end of the support portion to a second distal end, the trailing portion having the second diameter,
   wherein the first and second distal ends are each tufted, and
   wherein at least one of the leading portion or the trailing portion includes evenly spaced distance markings on an outer surface thereof, each distance marking representing a distance from the support portion to the distance marking.

17. A method of repairing a damaged area within a cored passage of a component, comprising the steps of:
   providing a repair tool with a hollow support portion, a hollow leading portion extending from a first end of the support portion, and a hollow trailing portion extending from a second end of the support portion, wherein the support portion is cylindrical and has a first diameter, the leading portion and the trailing portion each have a second diameter that is less than the first diameter, and wherein at least one of the leading portion or the trailing portion includes evenly spaced distance markings on an outer surface thereof, each distance marking representing a distance from the support portion to the distance marking;
   inserting the leading portion of the repair tool into a first opening of the cored passage;
   threading the repair tool through the cored passage until the distance markings indicate the support portion is positioned at the damaged area within the cored passage;
   circulating a coolant between the trailing portion and the leading portion and through the support portion;
   monitoring one or more parameters of the coolant;
   automatically controlling flow of the coolant based on the one more monitored parameters;
   performing a restoration activity on the damaged area as the support portion supports the cored passage proximate to the damaged area; and
   removing, upon completion of the restoration activity, the repair tool from the cored passage.

* * * * *